UNITED STATES PATENT OFFICE 2,415,554

THERAPEUTICALLY ACTIVE 1,3,5-TRIAZINE-DERIVATIVES

Ernst A. H. Friedheim, New York, N. Y.

No Drawing. Application August 27, 1942,
Serial No. 456,367

5 Claims. (Cl. 260—249.5)

This invention relates to therapeutically active organic condensation products containing at least one 1,3,5-triazine ring and to the methods of preparing such condensation products. It has particular relation to organic compounds which in addition to the 1,3,5-triazine ring or rings contain cyclic sulfonic acid radicals, and in which the link between the triazine ring and said radicals is formed by a system containing at least one cyclic organic radical carrying a divalent radical of an acid group, such as —CO— or —SO₂—, and an amino group. Both, the cyclic sulfonic acid radicals and the link-forming groups, may contain monocyclic or polycyclic, and isocyclic or heterocyclic radicals and they may also contain various substituents.

The compounds according to this invention have the general formula

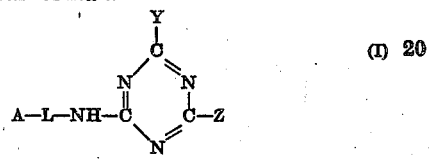

(I)

In the above Formula I A represents a cyclic sulfonic acid radical which may contain substituting groups, such as those selected from the group consisting of —OH, —O-alkyl, halogen, —NH-alkyl, —NH-acyl, —CO—NH₂, —SO₂—NH₂. As examples of the formulas of the beforementioned cyclic sulfonic acid radicals the following may be mentioned:

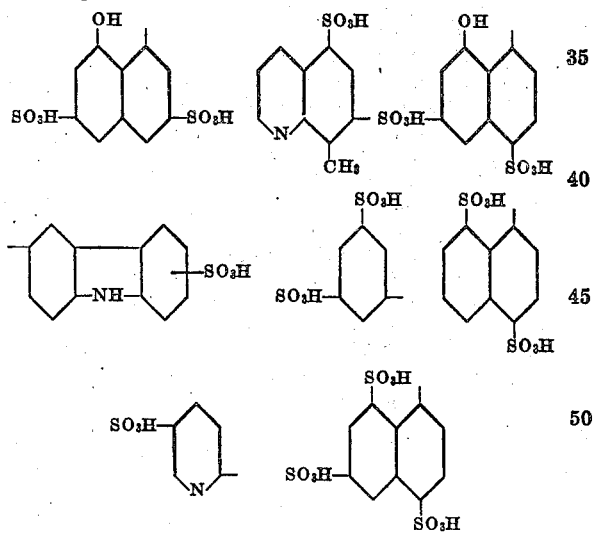

L stands for a cyclic, acid amide-containing link of the formula

—[(NH—R₁)(NH—R₂) ... (NH—Rᵤ)]— wherein (NH—R₁), (NH—R₂) ... (NH—Rᵤ) stand for identical or different cyclic groups carrying identical or different acid amide groups, such as —CO—NH—, —SO₂—NH—, and

—CH=CH—CO—NH— such acid amide groups being linked by their nitrogen atom to a nuclear carbon of the neighboring cyclic group. $u$ is an integer preferably smaller than 4. Thus, R₁, R₂ ... etc., may represent the residue of benzoic amide, naphthoic amide, benzene sulfonamide, naphthalene sulfonamide, including their substitution products, such as those carrying alkyl, oxy-alkyl, amino-alkyl, amino-acyl, halogen or nitro groups connected to the aromatic nuclei. As examples of the formulas of the groups (NH—R₁) ... etc., the following may be mentioned:

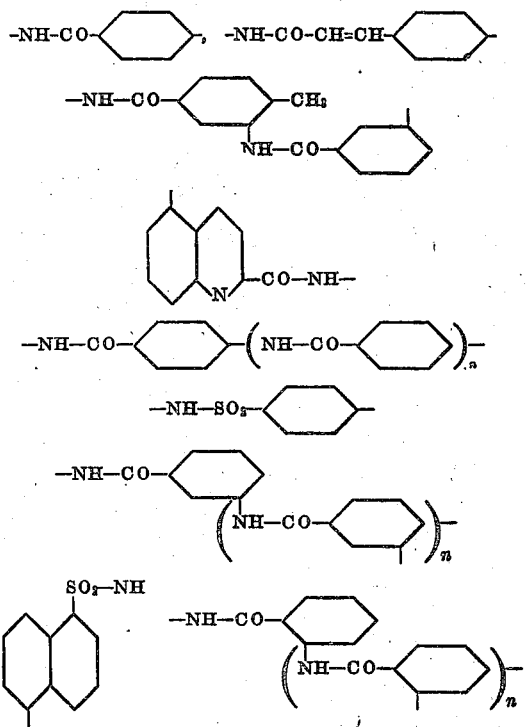

In the above formulas $n$ represents an integer being at least 1, and the individual (NH—R) groups may be linked in similar or different positions (ortho, meta, para) to each other.

Y and Z may be equal or different and may represent halogens, or residues of any inorganic or organic, aliphatic or aromatic, monocyclic or polycyclic, isocyclic or heterocyclic, molecule containing a hydrogen atom capable of reacting with a cyanuric halide with elimination of a halogen halide. For example, Y and Z may be —Cl, —Br, —I, —F, —H, —OH, —O-alkyl, —O-acyl, —NH₂, —NH-alkyl, —N-alkyl₂, —NH-acyl, —N-diacyl, —NH—NH₂, —NH—NH-alkyl, —N-alkyl-NH₂, —N-alkyl—NH-alkyl, —NH—NH-acyl,
—NH-acyl-NH₂, —NH-acyl-NH-acyl
—NH (CH₂)ₙ.CONH₂, —NH(CH₂)ₙ.NH₂
—NH(CH₂)ₙ.NH alkyl, —NH(CH₂)ₙ, —N-dialkyl,
—NH(CH₂)ₙOH, —NH.CH₂CHOH.CH₂OH,
—NH.OH, —NH.CN,

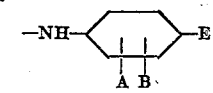

residues of cyanamide derivatives, residues of substituted guanidines, metallic radicals, —SH, alkyl radicals and their substitution products, and isocyclic or heterocyclic hydrocarbon radicals, which may be monocyclic or polycyclic, and their substitution products, such as O-aryl groups, amino-aryl radicals, such as those corresponding to the formula

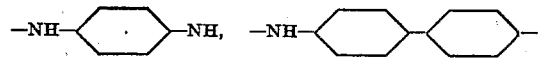

wherein A and B may represent equal or different substituents, and E may represent a radical selected from the group consisting of —SO₃H, —SO₂NH₂, metallic radicals, and triazine radicals. All these radicals standing for X and/or Y, may be linked to the triazine ring carbon atom directly or indirectly, the link between X and Y and said ring carbon atom being formed in the latter case, f. e. by radicals of the formula

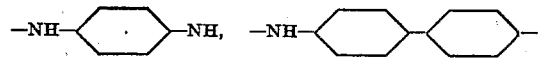

Finally Y and/or Z may also stand for equal or different groups corresponding to the symbol A—L—NH— or they may represent a group containing one or more triazine rings.

Preparation of compounds corresponding to the above general Formula I may be effected by reacting a compound of the formula A—L—W (referred to hereinafter as Formula II), with a 1,3,5-triazine compound of the formula

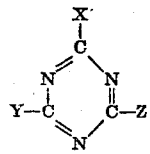

wherein W is halogen or an amino group and at least one of X, Y, Z is an amino group or halogen capable of reacting with W.

The resulting reaction products may, if so desired, and if they retain at least one halogen connected to a triazine ring carbon, be further treated with organic and inorganic compounds containing an active hydrogen atom capable of reacting with cyanuric halide with elimination of hydrogen halide. Such compounds are water, alcohols, phenols, naphthols, NH₃, substituted primary aliphatic and cyclic amines, organic and inorganic compounds carrying a —SH group, compounds of the formula A—L—NH₂, wherein these compounds may be the same as used in the first reaction stage, or different from the same. If a resulting reaction product contains an —NH₂ group attached to a triazine ring carbon, it may, if so desired, be reacted with any organic molecule capable of reacting with said amino group, such as a molecule of the formula A—L—W, wherein W is a halogen.

The compounds embodying the present invention present in the form of their sodium salts, white or yellowish powders, soluble in water, insoluble in chloroform and ether, and dissolving in concentrated sulfuric acid without or with slightly yellowish coloration.

*Example I.*—The reaction product of 1,4,6,8-naphthylamine trisulfonic acid and m-nitrotoluyl chloride is reduced and treated with m-nitrobenzoyl chloride to form after subsequent reduction the compound corresponding to the following Formula III, as suggested by E. Fourneau, Annales de l'Institut Pasteur, 1924, p. 108:

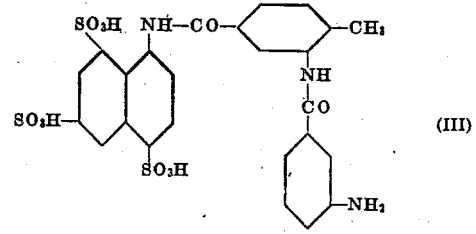

One mol of 5% aqueous solution of the sodium salt of this compound (III) containing one mol of sodium bicarbonate is poured slowly with efficient stirring and cooling into an ice-cold 10% suspension of one mol of cyanuric chloride in water. After all diazotable aromatic amine has disappeared from the reaction mixture, the reaction product is salted out, filtered off and purified by redissolving in water at slightly alkaline reaction (pH about 7.6), bone blacking and filtering. The sodium salt of a compound corresponding to the following Formula IV is obtained in the form of a white powder by salting out, filtration, washing with concentrated sodium acetate solution, alcohol and ether:

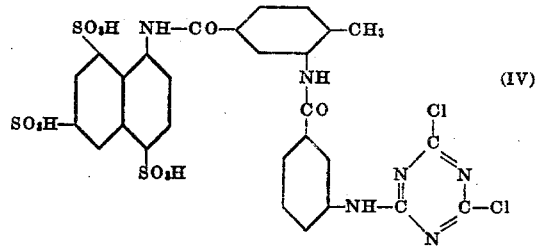

Compound IV may be reacted with ammonia in order to replace one or both Cl atoms by —NH₂ groups, or it may be reacted with compound III in order to react one or both Cl atoms in compound IV with the active hydrogen atom of the free amino group of compound III. If two Cl atoms of cyanuric chloride are replaced by the residue of compound III, the remaining Cl atom may be replaced by another radical, such as, for example, —NH₂ or —SH.

*Example II.*—Compound IV is dissolved in 10% aqueous ammonia at a temperature not exceeding 30° C. After standing for about 6 hours, the excess of ammonia is eliminated under vacuum and a product corresponding to the following Formula V is salted out, purified and isolated in the manner described in Example I.

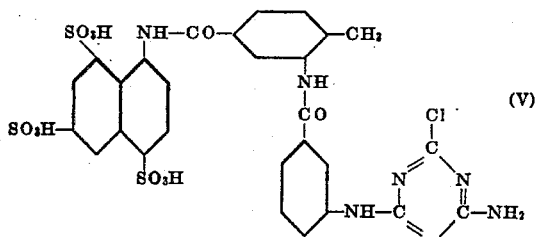

*Example III.*—By treating compound IV as described in Example II, but using concentrated aqueous ammonia, and the temperature of boiling water bath, both Cl-atoms of compound IV are replaced by NH₂-groups to form the compound corresponding to the following formula:

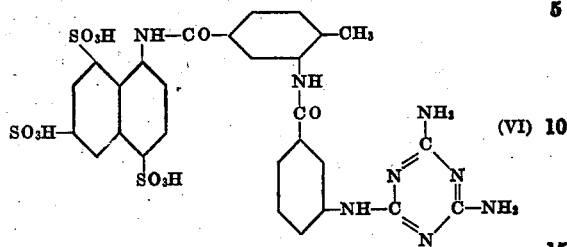

The same compound VI is obtained by suspending 1.1 mol of 2,4-diamino-6-chloro-1,3,5-triazine in a 5% aqueous solution of one mol of compound III, said solution also containing 1 mol of sodium acetate, and boiling the reaction mixture with stirring and refluxing until a clear solution is formed, and all diazotable aromatic amine has disappeared. Compound VI thus formed is isolated and purified substantially in the manner described in Example I.

*Example IV.*—A 5% aqueous solution of 2 mols of the sodium salt of compound III, containing 2 mols of sodium bicarbonate, is slowly introduced with efficient stirring into an ice-cold 10% suspension of 1 mol of cyanuric chloride in water. The temperature is kept below 5° C. until the first half of the solution is introduced, and allowed then to rise to room temperature but not over 30° C. Stirring is continued until all diazotable aromatic amine has disappeared from the reaction mixture. The compound formed is salted out, isolated and purified as in Example I, and has the following Formula VII:

The same compound VII may be prepared by treating a solution of the sodium salt of compound IV with an equimolecular quantity of the sodium salt of compound III. The chlorine atom in the triazine ring of compound VII may be substituted by —NH₂ by boiling compound VII with concentrated ammonia. It may also be substituted by the residue of compound III by refluxing an aqueous solution of the sodium salt of compound VII with an equimolecular quantity of the sodium salt of compound III. Compound VII may thus be prepared with or without isolation of the intermediate product corresponding to Formula IV. The Cl atom in the triazine ring of compound VII may also be replaced by —SH, by treating compound VII with hot concentrated NaSH solution.

*Example V.*—A 5% aqueous solution of 3 mols of the sodium salt of compound III, containing 3 mols of sodium bicarbonate is slowly introduced with efficient stirring to an ice-cold 10% suspension of one mol of cyanuric chloride in water. The temperature is so regulated that one third of the sulfonic acid solution is introduced at a temperature not exceeding 5° C. The temperature is then allowed to rise to room temperature, and after all sulfonic acid has been added, stirring is continued on the boiling water bath until all diazotable aromatic amine has disappeared. The new compound is then salted out, isolated and purified in the manner described in Example I. It has the following formula:

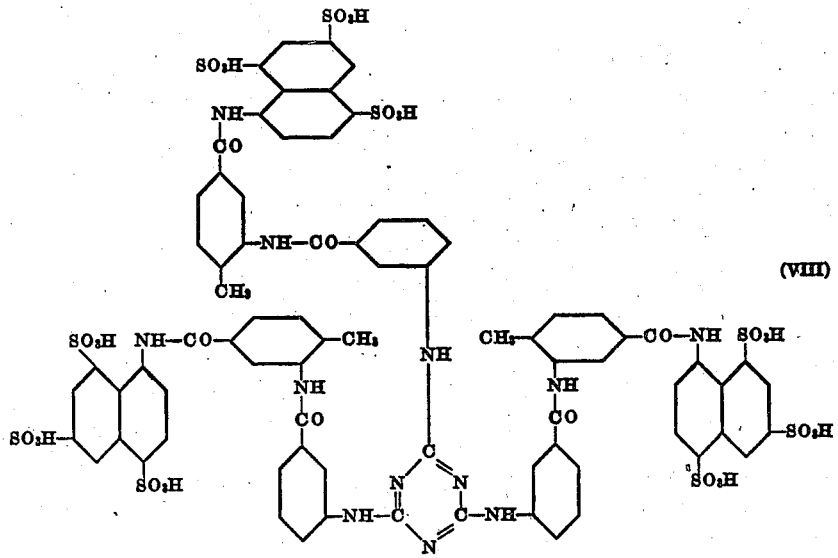

Compound VIII can also be prepared from the intermediate compounds corresponding to Formulas IV and VII.

In Examples III to V, 1,4,8-naphthylamine disulfonic acid may be used in place of 1,4,6,8-naphthylamine trisulfonic acid.

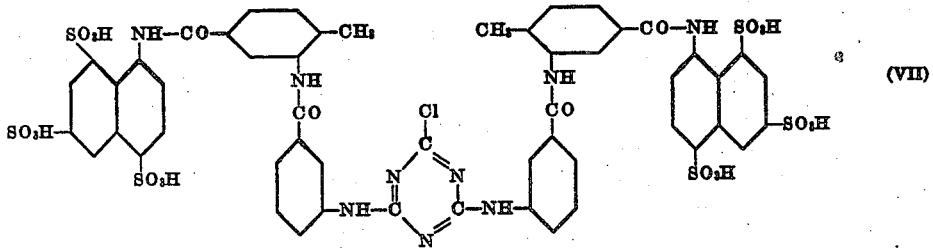

*Example VI.*—A compound (IX) of the formula

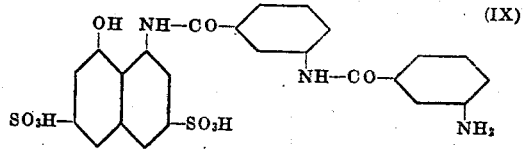

is prepared in a known manner (see U. S. Patent No. 1,308,071, issued on July 1, 1919). One mol of this compound, in mixture with 1 mol of sodium bicarbonate, is added in a concentrated aqueous solution of its sodium salt, slowly and with good stirring to 1 mol of a 5% aqueous solution of compound IV. Stirring is continued at a temperature ranging between 20° and 30° C. until all diazotable aromatic amine has disappeared from the reaction mixture. The compound formed is salted out of the reaction mixture, and isolated and purified as in Example I. It represents an asymmetrically substituted triazine of the Formula X.

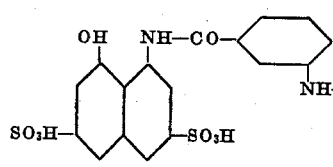

*Example VII.*—The halogen in the triazine ring of compound X may be substituted by refluxing one molecule of a solution of the sodium salt of compound X with a molecule of the sodium salt of compound III or IX, or another compound corresponding to the formula A—(NH—R)—NH₂, such as, for example, a compound of the formula

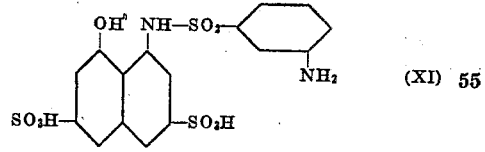

to form the following compound (XII):

*Example VIII.*—1 mol of the sodium salt of the compound IV is dissolved in water and treated on the water bath with 3 mols of NaSH in concentrated aqueous solution. The reaction is completed when all chlorine in the reaction mixture is present in the ionized form. The reaction product is salted out, isolated and purified as in Example I, but following the washing with alcohol with CS₂, alcohol and ether. It has the Formula XIII:

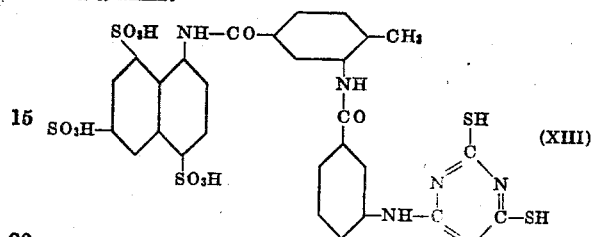

*Example IX.*—1 mol of the sodium salt of compound VII, in 5% aqueous solution, is treated on

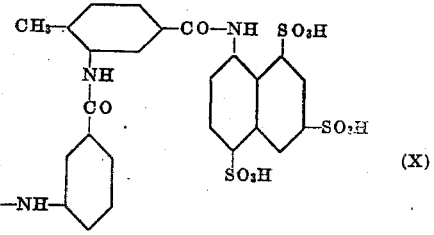

the water bath with 2 mols of NaHS in concentrated aqueous solution until all chlorine of the reaction mixture is in ionized form. The new compound, which may be salted out and purified in the manner described in Example VIII, has the Formula XIV.

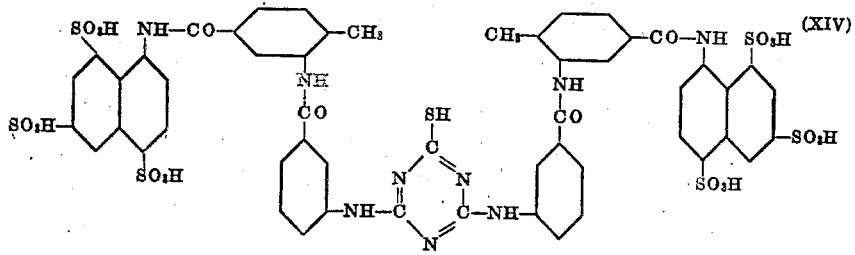

*Example X.*—One part of the sodium salt of compound XIV is dissolved in 20 parts of water. The solution is adjusted to a reaction just alkaline to phenolphthaleine, and mixed with a twofold excess of dilute (2%) H₂O₂. After standing for 24 hours at room temperature, a trace of catalase is added and a reaction product corresponding to Formula XV is salted out and purified as in Ex-

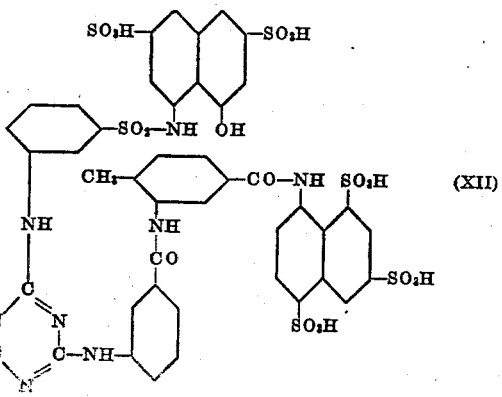

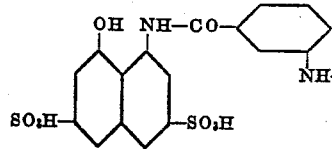

ample I. The compound thus formed has the formula:

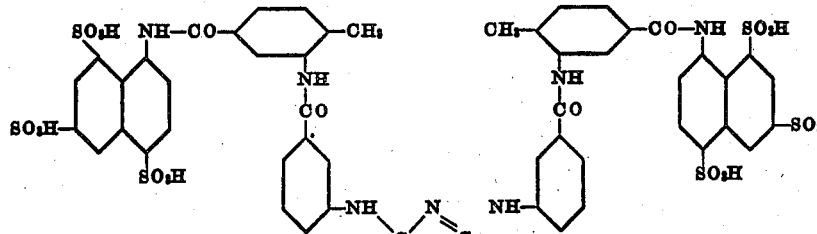

(XV)

This process allows the preparation of condensation products containing more than one triazine ring and showing a symmetry of structure relative to 2 planes.

By proceeding in analogous way, triazine disulfides may be obtained, showing only a simple symmetry relative to one plane. By treating, for example, compound V in an analogous manner, the following triazine disulfide (XVI) may be obtained:

*Example XI.—*

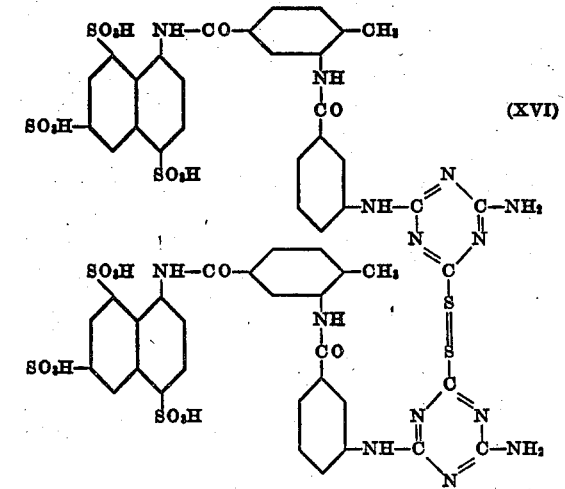

(XVI)

*Example XII.—*2 mols of the sodium salt of compound V are dissolved in 20 parts of water containing 2 mols of sodium acetate, and 1 mol of the disodium salt of benzidine 3,3′-disulfonic acid. The reaction mixture is boiled with refluxing until all diazotable aromatic amine has disappeared from the solution. The product formed (XVII) is salted out, isolated and purified in the manner described in Example I. It has the formula:

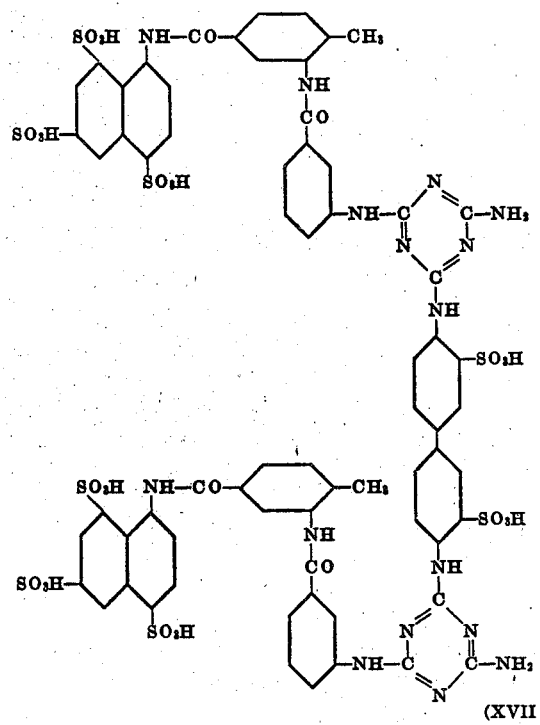

(XVII)

*Example XIII.—*2 mols of the sodium salt of a compound of the Formula XVIII.

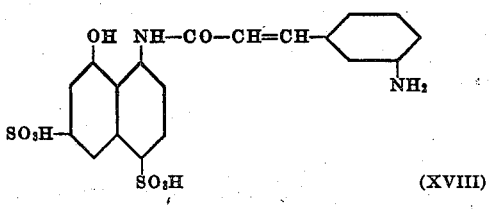

(XVIII)

prepared according to U. S. Patent 1,308,071, issued on July 1, 1919, dissolved in 10 parts of water containing 2 mols of sodium bicarbonate are run slowly with stirring into a cold 10% aqueous suspension of 2-amino-4,6-dichloro-1,3,5-triazine. The temperature is raised slowly to boiling and stirring is continued until all diazotable amine has disappeared. The new compound (XIX) is salted out, isolated and purified in the

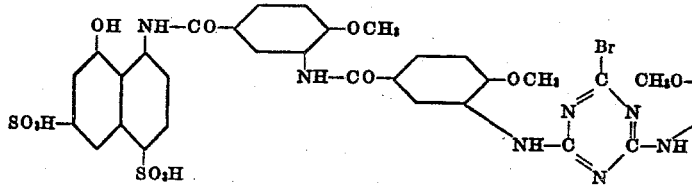

manner described in Example I. It has the formula:

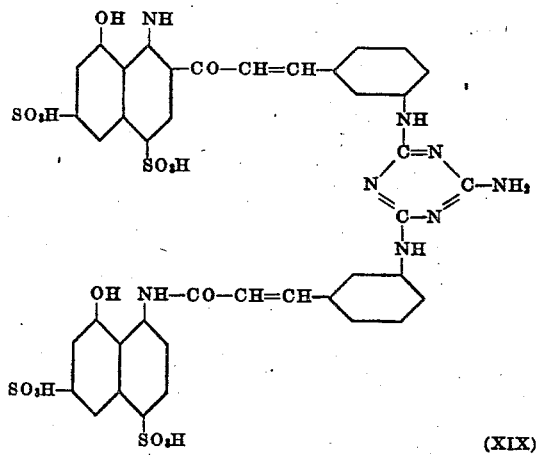

(XIX)

*Example XIV.*—A compound of the formula:

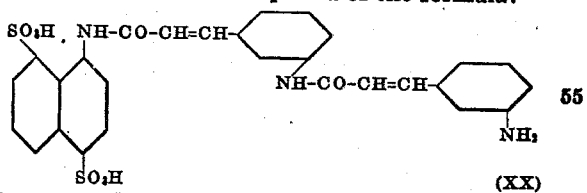

(XX)

is prepared according to standard methods outlined in Example I, and is used to replace one, two or three Cl atoms in cyanuric chloride. The reaction is carried out substantially in the manner described in the foregoing examples.

*Example XV.*—2 mols of the sodium salt of a compound XXI of the formula:

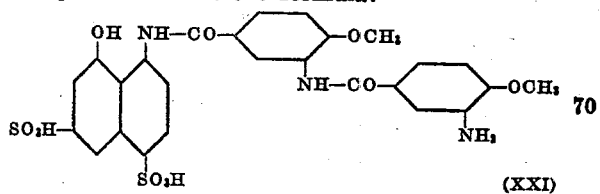

(XXI)

prepared as described in U. S. Patent No. 1,308,071 dissolved in 10 parts of water containing 2 mols of sodium acetate are run slowly with stirring into an ice-cold 10% suspension of cyanuric bromide. Stirring is continued while the temperature is slowly raised to the boiling point, until all diazotable amine has disappeared from the reaction mixture. The new compound (XXII) is salted out, isolated and purified in the manner described in Example I. It has the formula:

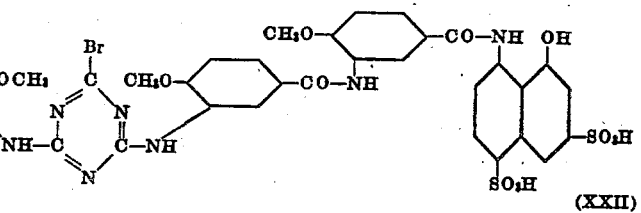

(XXII)

*Example XVI.*—By reacting one mol of 7-amino-8-methyl-chinoline-5-sulfonic acid with one mol of 1-nitro-naphthalene-5-sulfochloride and subsequent reduction of the reaction product the following substitution product is obtained:

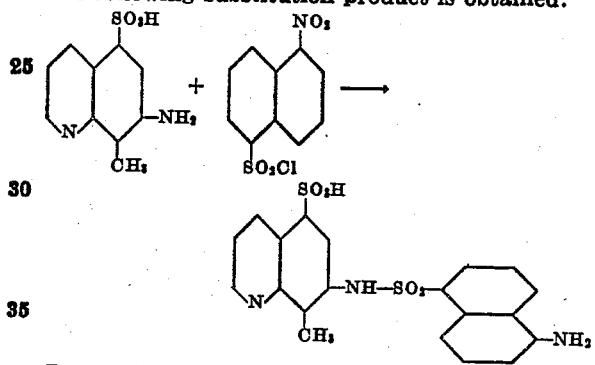

By reacting two mols of the sodium salt of this substitution product with one mol of cyanuric chloride in a manner analogous to that described in the preceding examples a compound of the following formula is obtained:

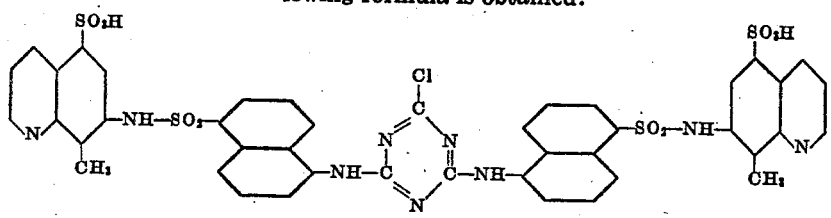

*Example XVII.*—A condensation product is prepared by reacting one mol of 1, 3, 5-aniline-disulfonic acid with one mol of chinoline-5-nitro-2-carbonyl chloride and subsequent reduction:

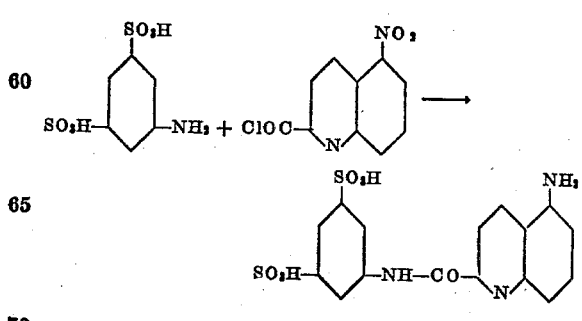

Two mols of the sodium salt of this new product are reacted with one mol of cyanuric chloride substantially in a manner analogous to that described in the preceding examples. The condensation product thus formed has the following formula:

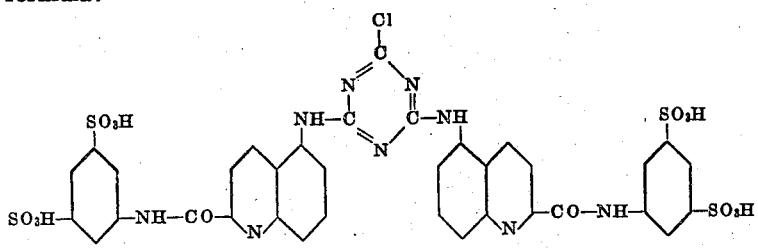

Various modifications and variations of the invention, as hereinbefore set forth, may be made without departing from the spirit and scope thereof, and therefore, only such limitations should be imposed as are included in the appended claims.

I claim:

1. A new 1, 3, 5-triazine compound consisting of a 1, 3, 5-triazine ring, at least one ring carbon atom of which is directly linked to a radical of the formula

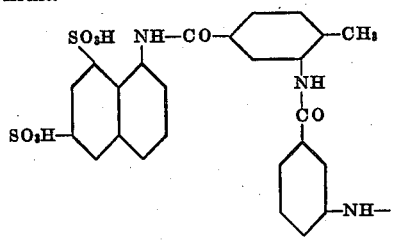

while remaining carbon atoms are connected to radicals selected from the group consisting of halogens and $NH_2$.

2. A process for obtaining condensation products containing a 1, 3, 5-triazine ring carrying at least one residue of the compound

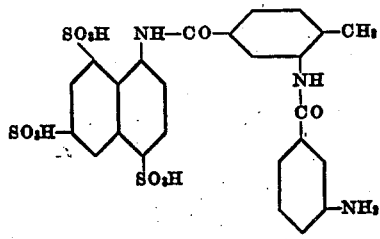

said process comprising reacting an aqueous solution of said compound with an aqueous suspension of cyanuric chloride in the presence of alkali biacrbonate.

3. An organic compound corresponding to the general formula

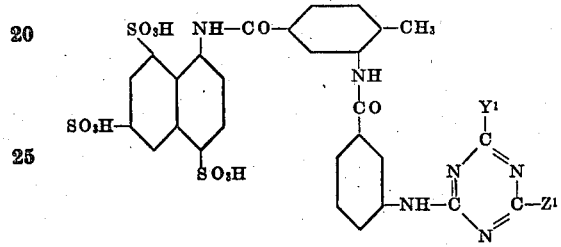

wherein $Y^1$ and $Z^1$ represent radicals selected from the group consisting of halogens and $NH_2$.

4. An organic compound corresponding to the formula

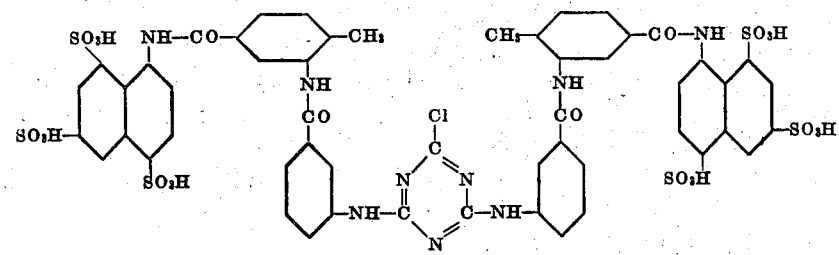

5. An organic compound corresponding to the formula

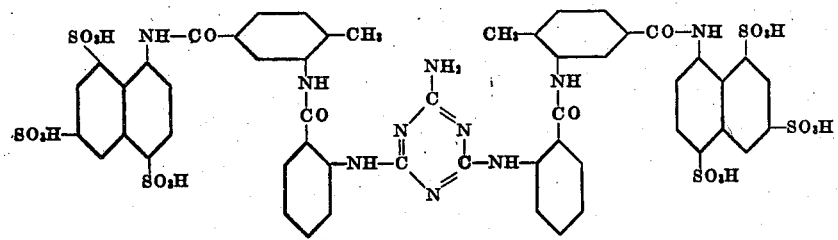

ERNST A. H. FRIEDHEIM.

REFERENCES CITED

The following references are of record in the file of this patent:

UNITED STATES PATENTS

| Number | Name | Date |
|---|---|---|
| 2,306,439 | Hentrich | Dec. 29, 1942 |
| 1,625,531 | Fritzsche | Apr. 19, 1927 |
| 1,625,533 | Fritzsche | Apr. 19, 1927 |
| 1,625,532 | Fritzsche | Apr. 19, 1927 |